US012597650B2

(12) United States Patent
Chao et al.

(10) Patent No.: US 12,597,650 B2
(45) Date of Patent: Apr. 7, 2026

(54) PORTABLE POWER SOURCE WITH LOW POWER DISPLAY

(71) Applicant: MILWAUKEE ELECTRIC TOOL CORPORATION, Brookfield, WI (US)

(72) Inventors: Chien-Chih Chao, Menomonee Falls, WI (US); Catherine K. Semon, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 582 days.

(21) Appl. No.: 17/319,501

(22) Filed: May 13, 2021

(65) Prior Publication Data

US 2021/0359350 A1    Nov. 18, 2021

Related U.S. Application Data

(60) Provisional application No. 63/023,942, filed on May 13, 2020.

(51) Int. Cl.
| | |
|---|---|
| *H01M 10/48* | (2006.01) |
| *G02F 1/167* | (2019.01) |
| *G06F 3/041* | (2006.01) |

(52) U.S. Cl.
CPC .......... *H01M 10/488* (2013.01); *G02F 1/167* (2013.01); *G06F 3/0412* (2013.01); *H01M 2220/30* (2013.01)

(58) Field of Classification Search
CPC ........... H01M 10/488; H01M 2220/30; H01M 10/425; H01M 50/204; G02F 1/167; G06F 3/0412; Y02E 60/10
See application file for complete search history.

(56) References Cited

U.S. PATENT DOCUMENTS

| | | |
|---|---|---|
| 10,608,453 B1 | 3/2020 | Partee et al. |
| 2015/0171632 A1 | 6/2015 | Fry et al. |
| 2015/0255029 A1* | 9/2015 | Niikura .................. G06F 3/044 |
| | | 345/98 |

(Continued)

FOREIGN PATENT DOCUMENTS

| | | |
|---|---|---|
| CN | 209545211 U | 10/2019 |
| KR | 1020140022185 A | 2/2014 |
| KR | 1020170047055 A | 5/2017 |

OTHER PUBLICATIONS

KR2014/0022185A to LG Displays English translation (Year: 2014).*

(Continued)

*Primary Examiner* — Daniel S Gatewood
(74) *Attorney, Agent, or Firm* — Michael Best & Friedrich LLP

(57) ABSTRACT

A portable power supply including a housing, a circuit, a battery power source, and an electronic-ink display. The housing supports a battery power source and a power outlet. The circuit is supported by the housing and includes a power input from the battery power source, a power output on the power outlet, and an inverter electrically connected between the power input and the power output. The battery power source includes a battery cell electrically connectable to the power input. Power is transferrable from the battery cell to the circuit to be output through the power output. The electronic-ink display is configured to display one or more parameters associated with the portable power source.

18 Claims, 4 Drawing Sheets

(56) References Cited

U.S. PATENT DOCUMENTS

| | | | |
|---|---|---|---|
| 2016/0099590 A1 | 4/2016 | Velderman et al. | |
| 2018/0034015 A1 | 2/2018 | Krantz et al. | |
| 2018/0054874 A1* | 2/2018 | Hunter | G06F 1/203 |
| 2019/0172411 A1* | 6/2019 | Murray | B60K 35/00 |
| 2019/0235607 A1* | 8/2019 | Hachinoda | G06F 3/044 |

OTHER PUBLICATIONS

Fernandez et al., Review of Display Technologies Focusing on Power Consumption, Sustainability 2015, 7, 10854-10875; doi: 10.3390/su70810854 (Year: 2015).*

Lee et al., In-cell adaptive touch technology for a flexible e-paper display, Solid State Electronics, vol. 56, Issue 1, Feb. 2011, pp. 159-162 (Year: 2011).*

Qin, Z., Chen, Y.-W., Lin, F.-C., Hung, C.-M., Shieh, H.-P. D., and Huang, Y.-P. (2018) Ambient-light-adaptive image quality enhancement for full-color e-paper displays using a saturation-based tone-mapping method. Jnl Soc Info Display, 26: 153-163. doi: 10.1002/jsid.645 ("QUIN") (Year: 2018).*

International Search Report and Written Opinion for Application No. PCT/US2021/032215 dated Aug. 31, 2021 (9 pages).

Nathan, "How E Ink's Electronic Paper Technology Works (Video)," <https://blog.the-ebook-reader.com/2015/02/23/how-e-inks-electronic-paper-technology-works-video/> web page publicly available at least as early as Feb. 23, 2015.

Pierce, "Get Ready for the World to be Covered in Electronic Ink," <https://www.wired.com/2016/05/get-ready-world-covered-electronic-paper/> web page publicly available at least as early as May 13, 2016.

Good Display, "1.54 inch e-paper display ultra low temperature E ink panel SPI interface GDEM0154E97LT," <https://www.e-paper-display.com/products_detail/productId=372.html> web page publicly available at least as early as Apr. 26, 2021.

Good Display, "1.2 inch e-paper display segment 4-digit e-paper screen GDEB0120-1," <https://www.e-paper-display.com/products_detail/productId=367.html> web page publicly availble at least as early as Apr. 26, 2021.

Extended European Search Report for Application No. 21803277.9 dated Apr. 22, 2024 (9 pages).

* cited by examiner

PORTABLE POWER SOURCE WITH LOW POWER DISPLAY

CROSS-REFERENCE TO RELATED APPLICATIONS

This application claims priority to, and the benefit of, U.S. Provisional Patent Application No. 63/023,942, filed May 13, 2020, the entire content of which is hereby incorporated by reference.

FIELD

Embodiments described herein relate to a portable power source.

BACKGROUND

Users of power tools, outdoor tools, and other powered equipment utilize a wide range of corded, AC products every day. These products include low-powered to high-powered tools and equipment, variable speed tools, and chargers for cordless batteries (referred to as "corded devices" or a "corded device"). These corded devices often do not have a suitable cordless option available. Even when cordless options are available, users may still prefer the corded devices, for example, due to additional costs associated with cordless solutions, because the users do not believe that cordless solutions can provide the performance, run-time, etc., needed to complete heavier-duty applications, etc.

SUMMARY

Mobile power sources, such as non-fuel based portable power sources and fuel based portable power sources are used in various environments and are often placed in direct sunlight or dark storage areas, as well as being subject to various weather conditions. These environments can make it difficult to view and/or interact with a user interface, such as an electronic display.

Accordingly, there is a need for an electronic user interface that is able to be easily viewed in multiple different environments.

Portable power supplies described herein include a housing, a circuit, a battery power source, and an electronic-ink display. The housing supports a battery power source and a power outlet. The circuit is supported by the housing and includes a power input from the battery power source, a power output on the power outlet, and an inverter electrically connected between the power input and the power output. The battery power source includes a battery cell electrically connectable to the power input. Power is transferrable from the battery cell to the circuit to be output through the power output. The electronic-ink display is configured to display one or more parameters associated with the portable power source.

Other portable power supplies described herein include a housing, a circuit, a battery power source, a controller, and low power display. The housing supports a battery power source and a power outlet. The circuit is supported by the housing and includes a power input from the battery power source, a power output on the power outlet, and an inverter electrically connected between the power input and the power output. The controller is in electronic communication with one or more sensors. The low power display is in communication with the controller and configured to display one or more parameters associated with the portable power source.

Devices described herein include a housing, a circuit, a battery power source, a controller, and a touch screen electronic-ink display. The housing supports a battery power source and a power outlet. The circuit is supported by the housing and includes a power input from the battery power source, a power output on the power outlet, and an inverter electrically connected between the power input and the power output. The battery power source includes a battery cell electrically connectable to the power input. Power is transferrable from the battery cell to the circuit to be output through the power output. The controller is in communication with one or more sensors. The touch screen electronic-ink display is in communication with the controller and is configured to display one or more parameters associated with the device. The touch screen electronic-ink display is further configured to receive a user input via a touch screen and communicate the user input to the controller.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
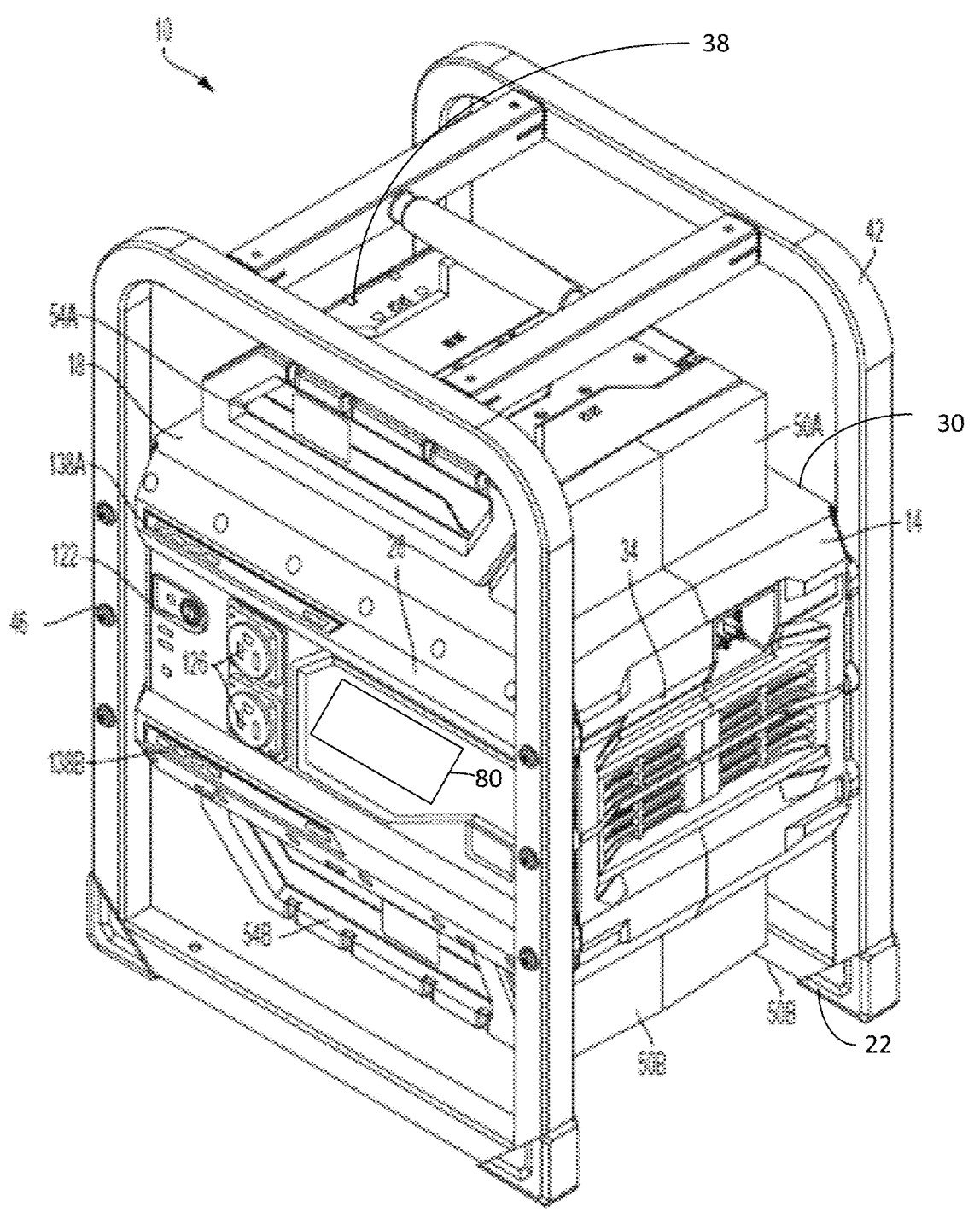
FIG. 1 is a perspective view of a portable power source, such as a battery pack powered portable power source, according to some embodiments.

FIG. 1 illustrates a portable power source 10 according to an embodiment described herein. The illustrated portable power source 10 is powered by one or more high power battery packs 54 (e.g., two battery packs 54A, 54B illustrated) and is operable to power different corded devices, such as power tools, outdoor tools, other powered equipment (e.g., lights, chargers for cordless batteries, etc.).

The battery packs 54 may include one or more cells strings, each having a number (e.g., 20) of battery cells connected in series to provide a desired discharge output (e.g., a nominal voltage [e.g., 20 V, 40 V, 60 V, 80 V, 120 V] and current capacity). The battery packs 54 may include a number of cell strings connected in parallel (e.g., a single cell string "20S1P", two cell strings "20S2P", three cell strings "20S3P", etc.). In other embodiments, other combinations (series, parallel, combination series-parallel configurations) of battery cells are also possible.

The illustrated portable power source 10 includes a housing 14 having a top 18, a bottom 22, a front 26, a rear 30, and opposite sides 34, 38. A roll cage 42 (for example, a frame) is fixed to the housing 14 to, for example, provide protection for and enable handling of the portable power source 10. The roll cage 42 inhibits contact with the housing 14 and the battery packs 54A-B (e.g., battery power source). As shown, the roll cage 42 is fixed to the front 26 and rear 30 of the housing 14 with fasteners 46. In some embodiments, the roll cage 42 may be fixed to other sides of the housing 14.

A battery support is provided for each battery pack 54. In the illustrated construction, the first battery support 50A is provided on the top 18 of the housing 14 and supports the first battery pack 54A; the second battery support 50B is provided on the bottom 22 of the housing 14 and supports the second battery pack 54B.

A user interface is provided on the front 26 of the housing 14. In the illustrated example, the user interface includes a power button 122, AC outlets 126, and a number of indicators (e.g., over-condition indicators, a wireless connection indicator, fuel gauges 138, battery charging indicators, etc.). The illustrated indicators include visual indicators and, in other constructions (not shown), may include other types of indicators, such as audible, tactile, etc.

The power button 122 may be implemented as a push-button, a two-way switch, a touch button, etc. The power button 122 is used to control power output to the user interface and can be activated to turn the portable power source 10 ON or OFF. When the power button 122 is used to turn ON the portable power source 10, power output through the AC outlets 126 is enabled and the over-condition indicators and the fuel gauges 138 are activated to display indications. When the power button 122 is used to turn OFF the portable power source 10, power output through the AC outlets 126 is disabled and the over-condition indicators and the fuel gauges 138 are deactivated.

The AC outlets 126 are, for example, 15 A, 120 V AC outlets that provide a similar power output as a wall outlet. The AC outlets 126 are powered by the battery packs 54. In the illustrated example, the over-conditions indicators include an over-temperature indicator and an overload indicator 150. A label 154, 158 may be provided alongside the over-temperature indicator 146 and the overload indicator 150, respectively.

The over-temperature indicator 146 is activated when a temperature of the portable power source 10 or the battery packs 54 exceeds a predetermined temperature threshold (e.g., outside the temperature range of −20° C. to 70° C.). The overload indicator is activated when a load output of the portable power source 10 exceeds a predetermined load threshold.

The wireless connection indicator indicates whether the portable power source 10 is wirelessly connected to a remote device (e.g., a smartphone or other user device). The fuel gauges 138A, 138B indicate the state-of-charge of the associated battery pack 54A, 54B, respectively. A charge indicator indicates a charging state of the associated battery pack 54A, 54B.

An AC input is provided on the first side of the housing 14. The AC input 162 may include a retractable or removable cable that can be plugged into an external power source (e.g., a 15 A, 120 V wall outlet). The AC input is used to supply power to charge the battery packs 54 supported on the portable power source 10. When connected to an external power source, the portable power source 10 may pass through AC power to the AC outlets 126 in addition to charging the supported battery pack(s) 54.

The portable power source 10 may also include a display 80. The display 80 may be configured to display information about the portable power source 10 to a user. Such information may include parameters such time of day, run time, remaining battery power, power output, AC power output status, USB power output status, temperature, state of charge, battery charging time, breaker trip, etc. Additional information may be configured to be displayed as needed.

In some embodiments, the display 80 is a touchscreen electronic display configured to allow a user to interact with the display 80. For example, the display 80 may be a capacitive touch screen, a resistive touch screen, or an inductive touch screen. In other embodiments, the display 80 is a static electronic display which is configured to display one or more parameters to a user.

In some embodiments, the display 80 is low power display such as an electronic-ink ("e-ink" or "e-paper") display or a low power reflective display ("LPRD"). The low power displays may be configured to provide an electronic display using minimal power. For example, the low power displays may be configured to consume less than 20 uA of current. However, low power displays that consume more than 20 uA or less than 20 uA are also contemplated. The low power displays may be grayscale or color displays. In some embodiments, the low power displays may include touchscreen capability allowing a user to directly input commands or other information into the low power displays. In other embodiments, the low power displays may be configured as a display only, and controlled via a controller, such as described below. The low power displays are described in more detail below.

Figure 2:
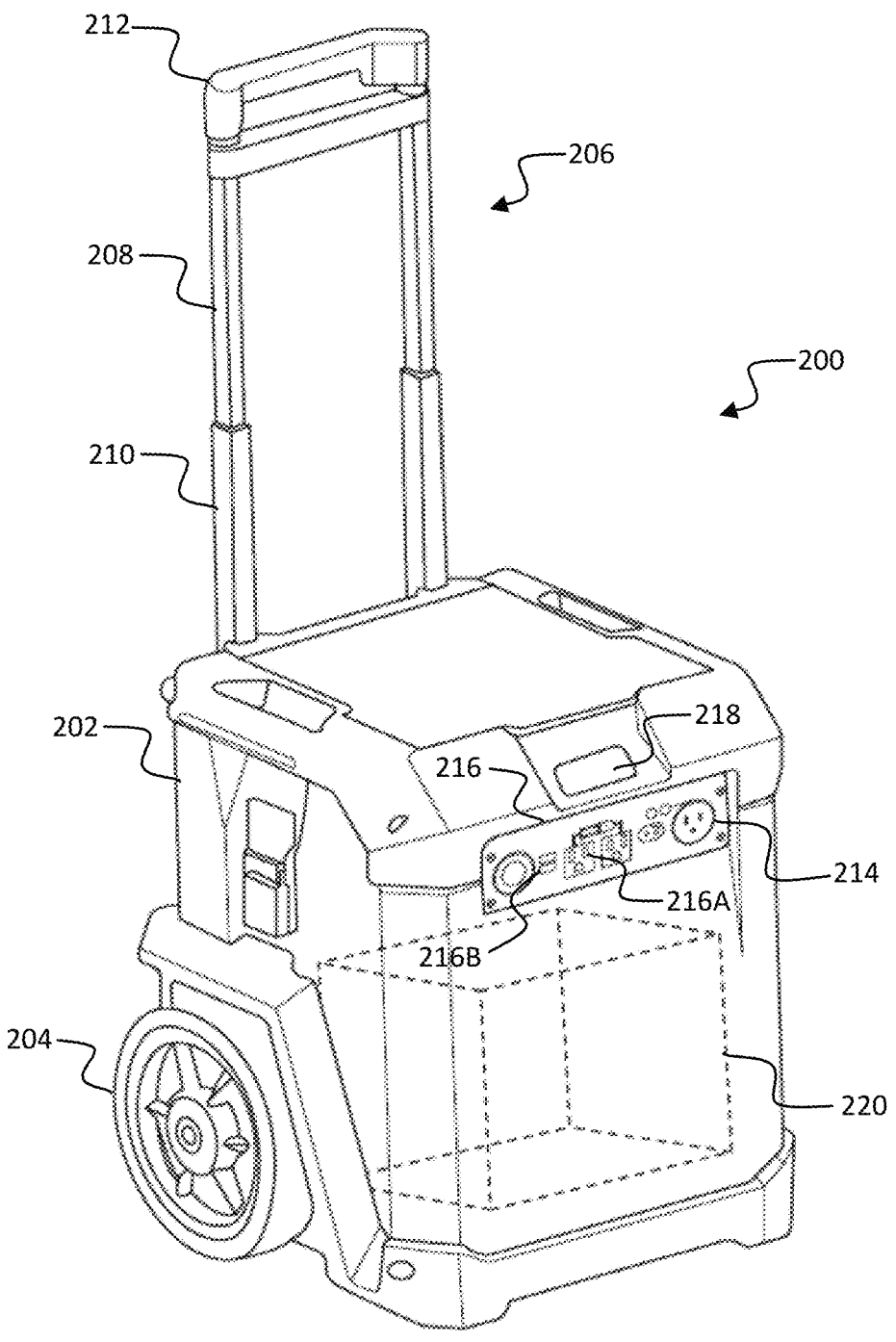
FIG. 2 is a perspective view of an alternate portable power source, such as an integrated battery-powered portable power supply, according to some embodiments.

FIG. 2 illustrates an alternative embodiment of a portable power supply device or power supply 200, according to some embodiments. The portable power supply 200 includes, among other things, a housing 202. In some embodiments, the housing 202 includes one or more wheels 204 and a handle assembly 206. In the illustrated embodiment, the handle assembly 206 is a telescoping handle movable between an extended position and a collapsed position. The handle assembly 206 includes an inner tube 208 and an outer tube 210. The inner tube 208 fits inside the outer tube 210 and is slidable relative to the outer tube 210. The inner tube 208 is coupled to a horizontal holding member 212. In some embodiments, the handle assembly 206 further includes a locking mechanism to prevent inner tube 208 from moving relative to the outer tube 210 by accident. The locking mechanism may include notches, sliding catch pins, or another suitable locking mechanism to inhibit the inner tube 208 from sliding relative to the outer tube 210 when the handle assembly 206 is in the extended position and/or in the collapsed position. In practice, a user holds the holding member 212 and pulls upward to extend the handle assembly 206. The inner tube 208 slides relative to the outer tube 210 until the handle assembly 206 locks in the extended position. The user may then pull and direct the power supply 200 by the handle assembly 206 to a desired location. The wheels 104 of the power supply 200 facilitate such movement.

The housing 202 of power supply 200 further includes a power input panel 214, a power output panel 216, and a display 218. In the illustrated embodiment, the power input panel 214 includes multiple electrical connection interfaces configured to receive power from an external power source. In some embodiments, the external power source may be a DC power source, for example, a photovoltaic cell (e.g., a solar panel), or the power source may be an AC power source, for example, a conventional wall outlet. In some embodiments, the power input panel 214 is replaced by or additionally includes a cable configured to plug into a conventional wall outlet. The power received by power input panel 214 may be used to charge an internal power source

220 disposed within the housing 202 of power supply 200. In some embodiments, the power source 220 is a rechargeable battery or battery pack, such as a lithium-ion battery or battery pack. In one embodiment, the power source 220 includes one or more removable and rechargeable battery packs, such as those used in power tools. For example, the power source 220 may be made up of one or more M18® battery packs from Milwaukee Tool. In other examples, the power source 220 may be made up of one or more MX Fuel™ battery packs from Milwaukee Tool. Other removable and rechargeable battery types are also contemplated.

The power output panel 216 includes one more power outlets. In the illustrated embodiment, the power output panel 216 includes a plurality of AC power outlets 216A and DC power outlets 216B. It should be understood that the number of power outlets included in power output panel 216 is not limited to the power outlets illustrated in FIG. 2. For example, in some embodiments of the power supply 200, the power output panel 216 may include more or fewer power outlets than the power outlets included in the illustrated embodiment of power supply 100. The power output panel 216 is configured to provide power from the internal power source 220 to one or more peripheral devices. The one or more peripheral devices may be a smartphone, a tablet computer, a laptop computer, a portable music player, a power tool, a power tool battery pack, a power tool battery pack charger, or the like. The peripheral devices may be configured to receive DC and/or AC power from the power output panel 216.

The display 218 is configured to indicate a state of the power supply 200 to a user, such as state of charge of the internal power source 220 and/or fault conditions. In some embodiments the display 218 includes one or more light-emitting diode ("LED") indicators configured to illuminate and display a current state of charge of internal power source 220. In some embodiments, the display 218 is low power display, such as an e-ink display or an LPRD display.

Figure 3:
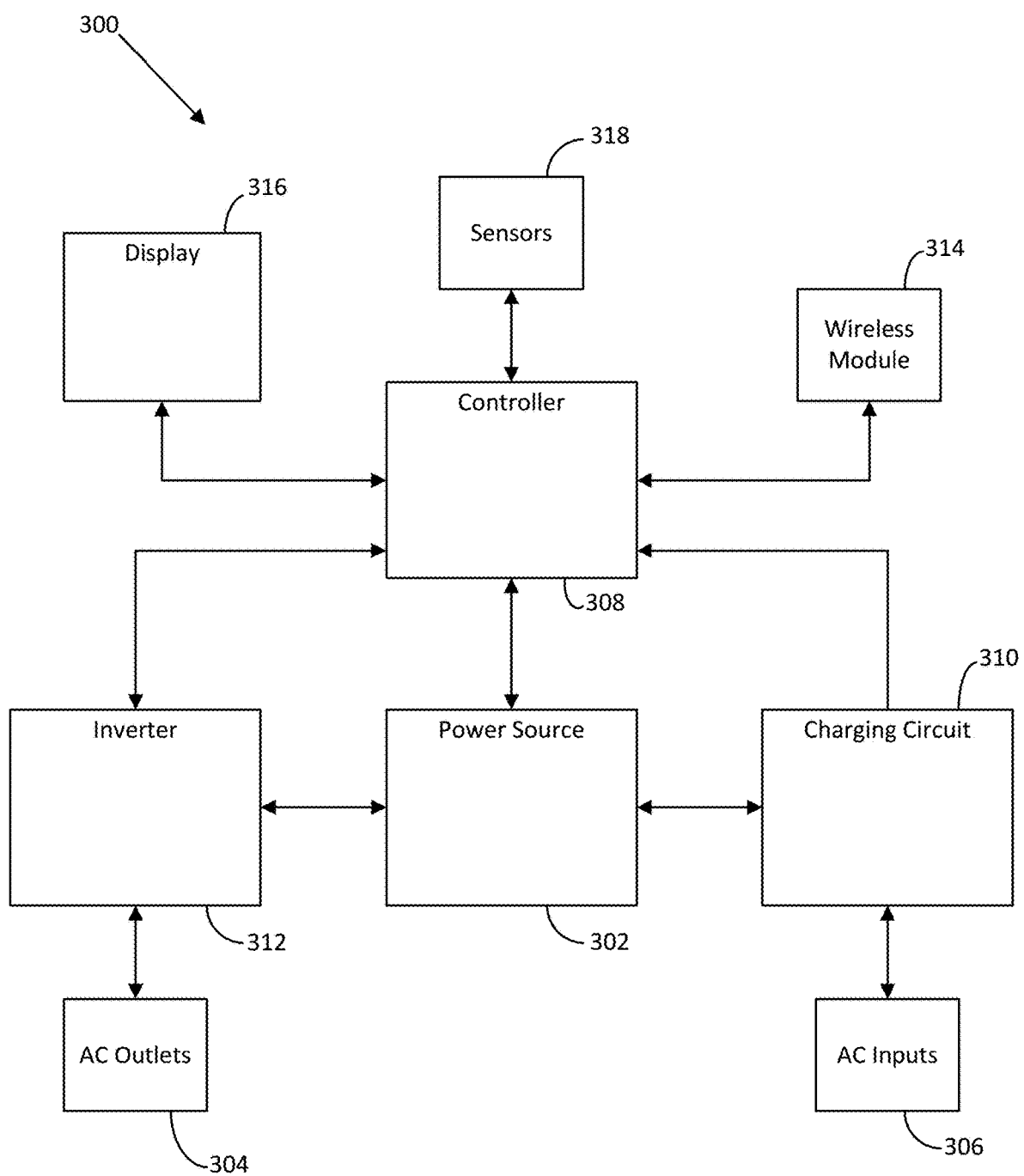
FIG. 3 is a block diagram of the portable power sources of FIG. 1 or 2, according to some embodiment.

FIG. 3 is a simplified block diagram of one embodiment of a portable power source 300, such as portable power source 10 and/or portable power supply 200. In the illustrated example, the portable power source 300 includes a power source 302, AC outlets 304, AC inputs 306, an electronic controller 308, a charging circuit 310, an inverter 312, a wireless module 314, a display 316, and one or more sensors 318.

In some embodiments, the controller 308 is implemented as a microprocessor with separate memory. In other embodiments, the controller 308 may be implemented as a microcontroller (with memory on the same chip). In other embodiments, the controller 308 may be implemented partially or entirely as, for example, a field programmable gate array (FPGA), an application specific integrated circuit (ASIC), a hardware implemented state machine, and the like, and a memory may not be needed or modified accordingly.

The charging circuit 310 is controlled by the controller 308 to provide charging current to the power source 302. The charging circuit 310 receives input power from the AC input 306 and provides the charging current to the power source 302. The power source may be one or more batteries or removable battery packs, such as those described above in regards to portable power source 10 and portable power supply 200.

The inverter 312 receives a DC power from the power source 302 and converts the DC power to an AC output (e.g., a 15 A, 120 VAC power output). The AC output is then provided to the AC outlets 126.

The inverter 312 may be controlled by the controller 308. The controller 308 provides enable/disable signals to the inverter 312 to enable or disable the inverter 312 from providing AC output to the AC outlets 304. The inverter 312 provides additional feedback to the controller 308. For example, the inverter 312 provides an over-temperature signal when the temperature of the inverter 312 exceeds a predetermined temperature threshold, an overload feedback signal when the load on the AC outlets 304 exceeds a predetermined load threshold, and provides a current sensor feedback indicating the amount of output current flowing to the AC outlets 304.

The wireless module 314 is, for example, a Bluetooth® Low Energy (BLE) module that enables wireless communication between the portable power source 300 and a user device (e.g., a smartphone, a laptop computer, etc.).

The controller 308 controls the display 316 (e.g., visual, audible, tactile, etc.) based on the status of the portable power source 300. The display 316 provides visual indications (e.g., a wireless connection indicator, power source levels, over-temperature status, overload status, power source temperature, remaining charge, time to charge, AC input status, AC outlet voltage, AC outlet current, inverter status, or sensed data provided by one or more sensors 318, etc.) The sensors 318 may include temperatures sensors, voltage sensors, ambient illumination sensors, and the like. In other embodiments, the display 316 may provide inputs to the portable power source 300. For example, the display 316 may include a touchscreen that can allow a user to provide inputs to set parameters, control the outputs, or perform other functions associated with operating the portable power source 300. In one embodiment, the display 316 is a low power display, such as an e-ink or an LPRD display. The controller 308 communicates with the display 316 using one or more communication protocols. In one embodiment, the controller 308 communicates with the display 316 using an I²C protocol.

Figure 4:
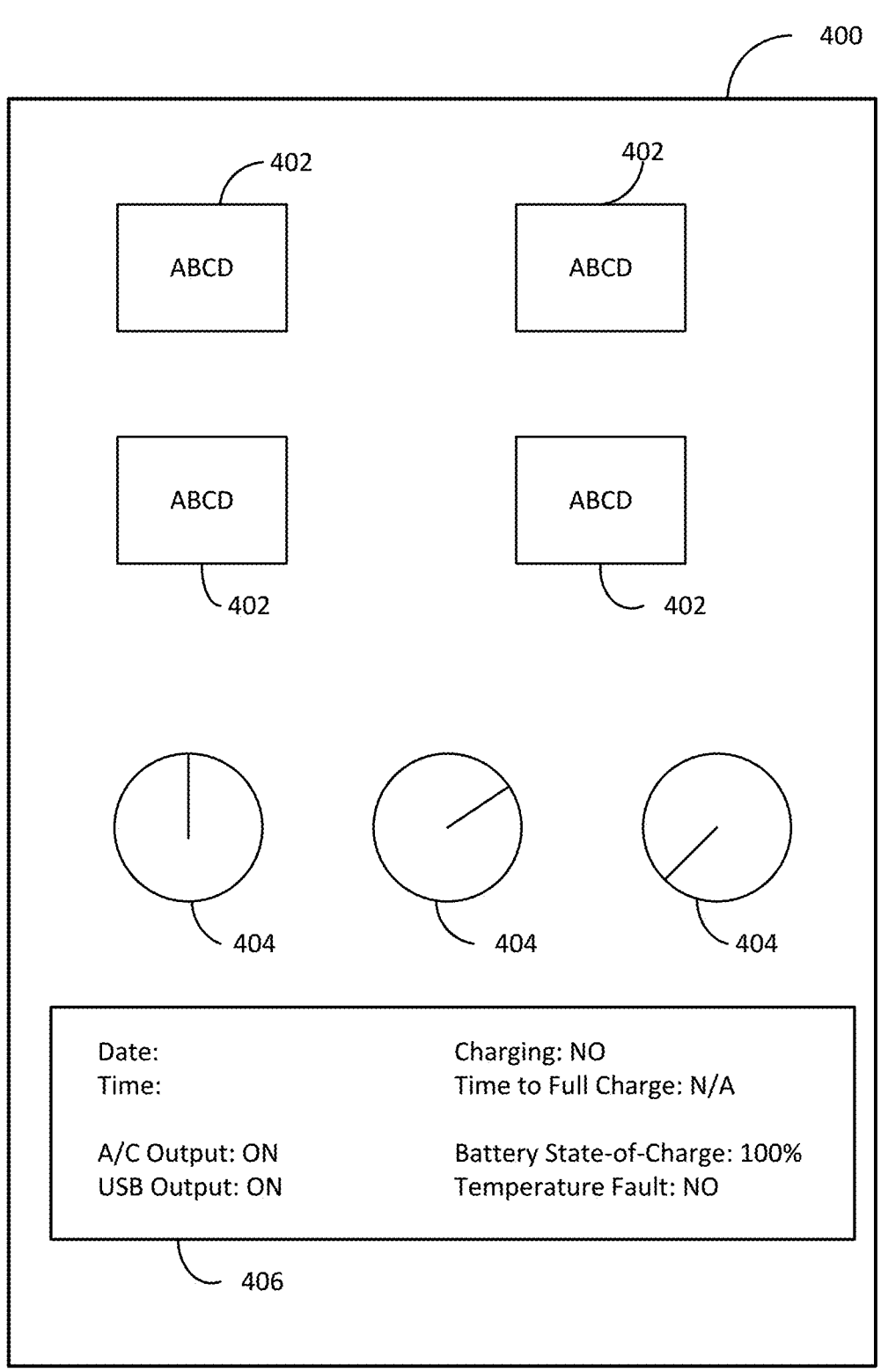
FIG. 4 illustrates an electronic-ink ("e-ink") display, according to some embodiments.

FIG. 4 illustrates a low power display 400, according to some embodiments. In one embodiment, the low power display 400 is the same as the display 316 described above. As described above, the low power display 400 may be an e-ink display or an LPRD display. The low power display 400 may include one or more icons 402, electronic gauges 404, text portions 406, etc. It is understood that the low power display 400 is exemplary only, and that various configurations are contemplated. For example, the low power display 400 may be able to be configured for each application, and may include a series of menus, graphics, text, or other visual indications to provide information to a user. As described above, the low power display 400 may be configured to provide visual indications of a wireless connection indicator, power source levels, over-temperature status, overload status, power source temperature, remaining charge, time to charge, AC input status, AC outlet voltage, AC outlet current, inverter status, ambient temperature data, battery voltage data, ambient illumination data, run time data, or other data associated with the operation of a portable power source. In some embodiments, the low power display 400 includes touchscreen functionality allowing a user to provide input directly to the e-ink display. In other embodiments, the low power display 400 is a read only display and requires external inputs to be controlled.

As described above, the low power display 400 may be an e-ink display. The e-ink display may utilize one or more types of e-ink display. Example e-ink display types include E Ink Vizplex, E Ink Pearl, E Ink Mobius, E Ink Triton, E Ink Carta, E Ink Carta HD, E Ink Kaleido, E Ink Spectra, Advanced Color ePaper, and the like. In other embodiments, the low power display 400 may be an LPRD display, such as an LCD ECB reflective display. Example LPRD displays may include memory drive Memory-in-Pixel (MIP) LCDs, hybrid (memory drive and normal drive) MIP LCDs, and the like. In some examples, the e-ink display may include one or more multi-segment displays, such as seven-segment displays. In other examples, the e-ink display may be a segmented controller on glass.

In some embodiments, the low power display 400 includes a glass backplane or a flexible backplane. The low power display 400 may include an illumination system, such as a backlight illumination, a sidelight illumination, a front light illumination, and the like. In some embodiments, a controller, such as controller 308, may control the illumination system based on a sensed ambient illumination. In other embodiments, the illumination system of the low power display 400 may be configured to automatically adjust the illumination based on an ambient lighting level. For example, the low power display 400 may include an ambient light sensor for sensing an ambient light. In other embodiments, the controller 308 may provide an ambient lighting level to the low power display 400.

In one embodiment, the e-ink display includes an anti-glare treatment to reduce glare. The anti-glare treatment can allow a user to more easily view the content displayed on the e-ink display when in direct sunlight. In some embodiments, the low power display 400 may be configurable such that a user can adjust a shade (e.g. contrast ratio, color, etc.) of the display. For example, the user may be able to adjust the shade in a range from a white light to a warm amber color. In some examples, the low power display 400 is configured to automatically adjust the shade based on a detected ambient light. In other examples, the low power display 400 is configured to automatically adjust the shade based on a time of day. For example, a user may modify parameters associated with the low power display 400 to control when to adjust the shade. In other examples, the low power display 400 may automatically adjust the shade of the display based on pre-established time, such as those set at the factory.

In some embodiments, the e-ink display may have an operating temperature range of −20° C. to 55° C. In other examples, the e-ink display may have an operating temperature range of 0° C. to 55° C. In one embodiment, the e-ink display is a 1.2-inch display. In other examples, the e-ink display is a 1.5-inch display. In other examples, the e-ink display is between 1-inch and 6-inches. However, displays smaller than 1.2 inches and greater than 1.5 inches are also contemplated. In some embodiments, the e-ink display is a black text on white background display. In other examples, the e-ink display is a white text on black background display. In some embodiments, the e-ink display has a refresh rate of 3 seconds. However, in other examples, the e-ink display may have a refresh rate of more than 3 seconds or less than 3 seconds. In one example, the e-ink display has a contrast ratio of 9:1. However, ratios of more than 9:1 or less than 9:1 are also possible.

Thus, embodiments described herein provide, among other things, a portable power source that includes a low power display. Various features and advantages are set forth in the following claims.

What is claimed is:

1. A portable power source comprising:
a housing supporting a battery power source and a power outlet;
a circuit supported by the housing and including:
a power input from the battery power source, a power output on the power outlet, and an inverter electrically connected between the power input and the power output, the battery power source including:

a battery cell electrically connectable to the power input, wherein power is transferrable from the battery cell to the circuit to be output through the power output; and an electronic-ink display configured to display one or more parameters associated with the portable power source, wherein a controller is configured to automatically adjust a contrast ratio or color of the electronic-ink display based on a time of day, wherein the electronic-ink display includes an electronic gauge having a refresh rate of more than 3 seconds, and wherein the electronic-ink display includes a multi-segment display.

2. The portable power source of claim 1, wherein the electronic-ink display includes a touch screen electronic-ink display.

3. The portable power source of claim 2, wherein the touch screen electronic-ink display is one of a capacitive touch screen electronic-ink display, an inductive touch screen electronic-ink display, or a resistive touch screen electronic-ink display.

4. The portable power source of claim 1, wherein the one or more parameters associated with the portable power source include one or more of a time of day, a run time, a remaining battery power, the power output, an AC power output status, a USB power output status, a temperature, a state of charge, a battery charging time, and a circuit breaker status.

5. The portable power source of claim 1, wherein the electronic-ink display includes an illumination system.

6. The portable power source of claim 5, wherein the illumination system includes one or more of a backlight illumination, a front light illumination, or a sidelight illumination.

7. A portable power source comprising:

a housing supporting a battery power source and a power outlet;

a circuit supported by the housing and including:

a power input from the battery power source, a power output on the power outlet, and an inverter electrically connected between the power input and the power output;

a controller in electronic communication with one or more sensors; and a low power electronic-ink display in electronic communication with the controller and configured to display one or more parameters associated with the portable power source, wherein the low power display consumes 20 microamps or less during operation, wherein the electronic ink display includes a multi-segment display.

8. The portable power source of claim 7, wherein the one or more sensors include an ambient light sensor.

9. The portable power source of claim 8, wherein the controller is configured to control an illumination level of the low power display based on a sensed ambient light level determined by the ambient light sensor.

10. The portable power source of claim 8, wherein the controller is configured to control a display contrast of the low power display based on a sensed ambient light level determined by the ambient light sensor.

11. The portable power source of claim 7, wherein the one or more parameters associated with the portable power source include one or more of a time of day, a run time, a remaining battery power, the power output, an AC power output status, a USB power output status, a temperature, a state of charge, a battery charging time, and a breaker status.

12. The portable power source of claim 7, wherein the battery power source is internal to the housing.

13. A device comprising:

a housing supporting a battery power source and a power outlet;

a circuit supported by the housing and including:

a power input from the battery power source, a power output on the power outlet, and an inverter electrically connected between the power input and the power output, the battery power source including:

a battery cell electrically connectable to the power input, wherein power is transferrable from the battery cell to the circuit to be output through the power output;

a controller in communication with one or more sensors; and a touch screen electronic-ink display in communication with the controller and configured to display one or more parameters associated with the device, wherein the touch screen electronic-ink display is further configured to receive a user input via a touch screen and communicate the user input to the controller, wherein the touch screen electronic-ink display includes an electronic gauge having a refresh rate of more than 3 seconds, wherein the electronic-ink display includes a multi-segment display.

14. The device of claim 13, wherein the controller is configured to control an output power of the device based on the user input.

15. The device of claim 13, wherein the touch screen is one of a capacitive touch screen, an inductive touch screen, and a resistive touch screen.

16. The device of claim 13, wherein the controller is configured to automatically adjust a contrast ratio or color of the touch screen electronic-ink display based on at least one selected from the group consisting of a detected level of ambient light and a time of day.

17. The portable power source of claim 1, wherein the electronic-ink display includes an electronic gauge having a refresh rate of less than 3 seconds.

18. The portable power source of claim 7, wherein the electronic-ink display includes an electronic gauge having a refresh rate of less than 3 seconds.

* * * * *